United States Patent [19]

Jacobi et al.

[11] 4,423,334
[45] Dec. 27, 1983

[54] WAVE MOTION ELECTRIC GENERATOR

[76] Inventors: Edgar F. Jacobi, 1027 Woodland Pl., Menasha, Wis. 54952; Robert J. Winkler, 2101 E. 4th St., Ste. 150, Santa Ana, Calif. 92704

[21] Appl. No.: 79,974

[22] Filed: Sep. 28, 1979

[51] Int. Cl.³ ............................................. F03B 13/12
[52] U.S. Cl. ......................................... 290/53; 290/42
[58] Field of Search ...................... 290/42, 43, 53, 54; 440/10; 9/8.3 E; 416/85; 417/61, 328, 332, 337

[56] References Cited

U.S. PATENT DOCUMENTS

| 628,457 | 7/1899 | Gehr | 290/42 |
|---|---|---|---|
| 3,011,062 | 11/1961 | Goldsmith | 290/53 |
| 3,231,749 | 1/1966 | Hinck | 290/53 |
| 3,696,251 | 10/1972 | Last et al. | 290/53 |
| 4,110,630 | 8/1978 | Hendel | 290/53 |
| 4,260,901 | 4/1981 | Woodbridge | 290/53 |

Primary Examiner—B. Dobeck
Assistant Examiner—Shelley Wade

[57] ABSTRACT

Set out herein is an electrical generator conformed for installation in a buoy, the generator comprising an inverted pendulum having two windings formed at the free end thereof and aligned to articulate between two end stops each provided with a magnetic circuit. As the loops thus pass through the magnetic circuit, electrical current is induced which may be rectified through a full way rectifier to charge up a storage battery. The buoy itself may be ballasted to have its fundamental resonance at more than double the wave frequency with the result that during each passing of a wave at least two induction cycles occur.

1 Claim, 4 Drawing Figures

WAVE MOTION ELECTRIC GENERATOR

BACKGROUND OF THE INVENTION

1. Field of the Invention

The present invention relates to wave action power generators, and more particularly to power generators useful with a buoy.

2. Description of the Prior Art

Use of wave activity to charge up electrical power in various buoys or warning floats has been known in the past. In most of such prior art generating systems, the oscillatory motion of the buoy is most frequently used as the source of motor power to develop electricity. The dynamics of motion of a buoy, however, are classically limited in amplitude with the result that low induction velocities are available for charging or velocities only during a very limited portion of a cycle can be utilized. For this reason the amount of power normally realizable in the course of wave motion has been heretofore quite limited rendering the cost entailed in the charging circuit and the implementation of the power conversion impractical when considered with the cost of the power conserved.

Buoys are often deployed throughout navigable waters for the purpose of providing markings and thus often include either a bell or a light or both to enhance the usefulness thereof. Most typically the light is turned on during periods of low visibility or at night, the power consumed during these periods being obtained through the use of a battery. Thus, one of the normal exercises attendant in the maintenance of navigatable waters is the periodic replacement of batteries in buoys, a task sometimes difficult to achieve and entailing large costs. A recharging apparatus which may alleviate the necessity of this periodic service or which may substantially decrease the frequency thereof is therefore both desired and necessary.

SUMMARY OF THE INVENTION

Accordingly, the general purpose and object of the present invention is to provide a charging arrangement useful with floating devices conformed to multiply the number of charging cycles for each wave transition.

Other objects of the invention are to provide a charging device including an inverted pendulum having a series wound induction arrangement which is induced at both limits of the swing thereof.

Yet additional objects of the invention is to provide a charging arrangement conformed to double the fundamental frequency of the buoy.

Briefly, these and other objects are accomplished within the present invention by deploying a pendulum on the interior of a ballasted buoy, the pendulum being aligned to swing in an arc above its pivot and to pass into the interior of two magnetic circuits at the ends of the swing. Formed on the pendulum are two windings connected in series, the windings being aligned for cumulative induction at each end of the stroke. These windings are series connected across a full wave rectifier which is then applied to a battery. The magnetic circuits themselves may comprise either permanent magnets or battery excited core pieces aligned with their gap deployed in the paths of the pendulum swing. Thus the pendulum with the windings mounted thereon passes through the magnetic circuit gaps and in the course of each passing a current is induced onto the windings for charging the batteries.

DESCRIPTION OF THE SPECIFIC EMBODIMENT

Figure 2:
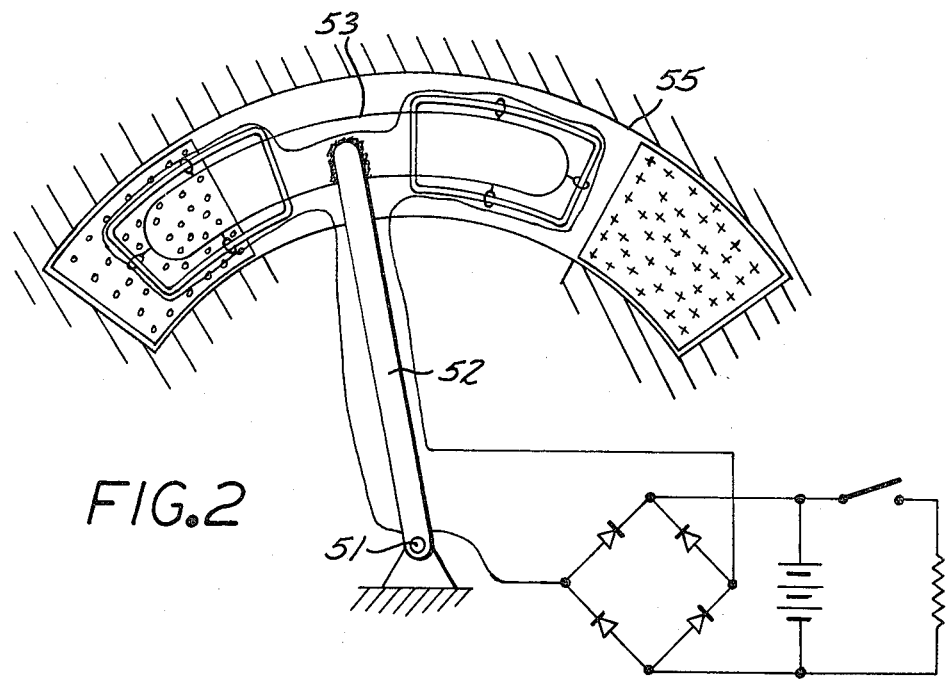
FIG. 2 is a side view, in partial section, of the charging arrangement shown in FIG. 1.
Figure 1:
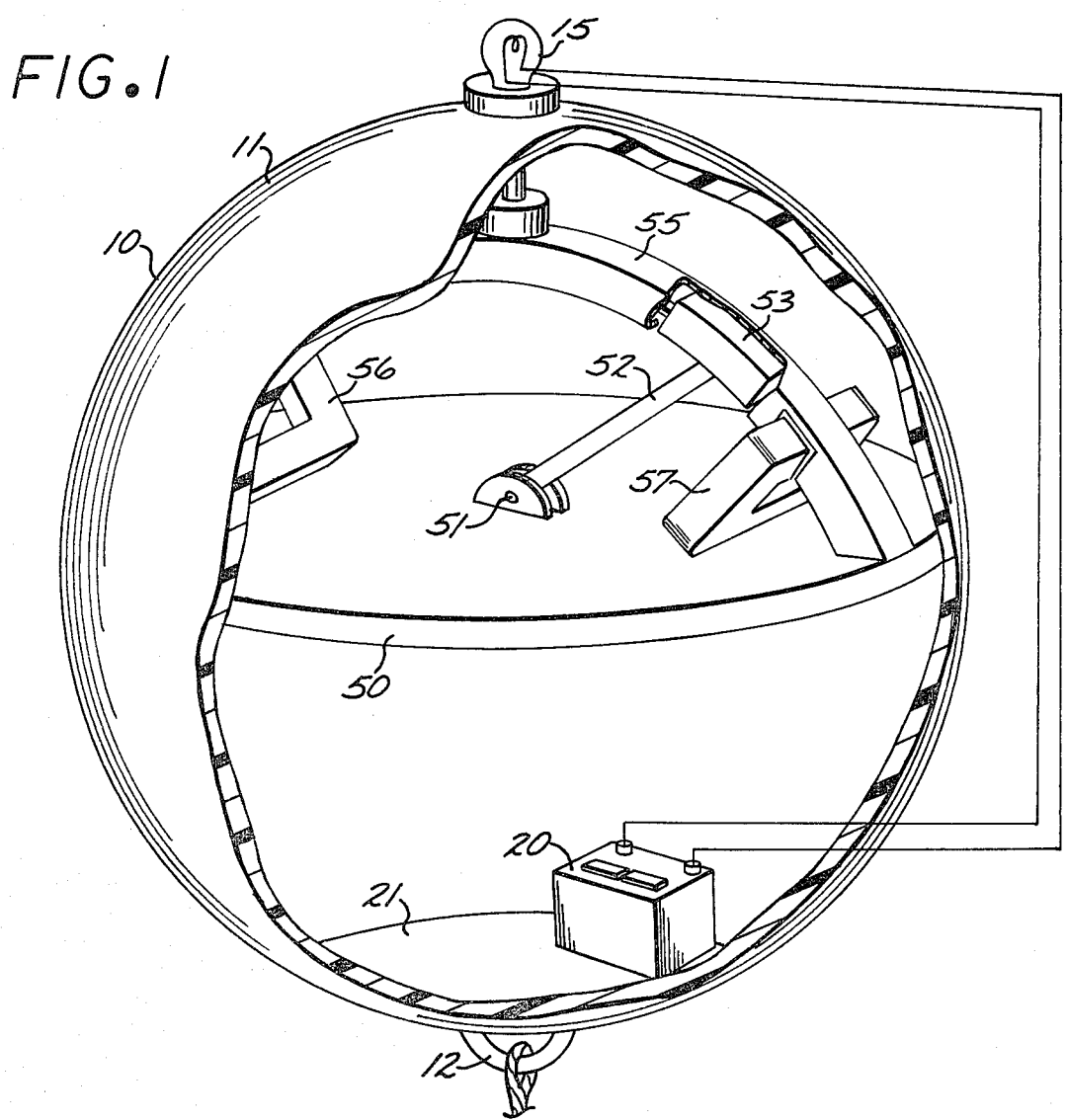
FIG. 1 is a perspective illustration, in partial cutout, of a buoy assembly provided with a charging arrangement constructed according to the invention herein.

As shown in FIGS. 1 and 2, a spherical buoy, generally designated by the numeral 10, typically comprises a shell or housing 11 provided with a hook or attachment fixture 12 to which any anchoring string or cable is attached. In the foregoing form, the shell or housing 11 provides a buoyant structure which may support any beacon light, horn, or bell, or any combination thereof. To excite the horn or bell, illustrated herein by way of a light bulb 15, a battery 20 is provided housed on the interior of housing 11 and arranged to form a ballasting structure together with a ballast weight 21 for keeping the buoy upright.

In this form the buoy assembly 10 will remain operative for as long as the battery 20 contains its charge. Thus it has been the normal exercise in the past to periodically service this buoy, the service sequence including the replacement of the battery with a newly charged battery. To reduce the incidence of such periodic maintenance trips or excursions, the buoy assembly 10 includes on the interior thereof a support platform 50 extending substantiallly across the interior of housing 11, platform 50 being provided with a pivot 51 at the center thereof. Extending from pivot 51 is a pendulum arm 52 connected at the free end to an arcuate bob weight 53 which, by virtue of the pivot attachment is restrained to pivot along an arc coincident with an arcuate pivot track 55. This acruate pivot track 55 extends over the platform 50 being conformed as a semicircular channel section extending between two magnetic loops 56 and 57 one at either end thereof.

More specifically, magnetic loops 56 and 57 comprise loops of magnetic material or a structure which may be either magnetized as a permanent magnet or may include windings for magnetic induction. Loops 56 and 57 include an air gap 56a and 57a respectively, these air gaps being aligned to receive in translation the bob weight 53.

As shown in more detail in FIG. 2, bob weight 53 is provided with two windings 53a and 53b respectively aligned at the ends thereof, each of the windings being conformed to form a loop in the plane of the corresponding air gap. Thus, the effective loop dimension of winding 53a for example, as it passes through the corresponding air gap is the height of the winding shown herein by the dimension L. Windings 53a and 53b are wound in opposition and connected in series across a full wave rectifier bridge 61 which, on its other terminals, is connected across battery 20.

Referring further to FIG. 2, the voltage applied to the windings 53a and 53b corresponds to the number of turns in each winding, the length L or the effective length of each winding, the magnetic field strength and the rate of passage of the winding through the magnetic field. In this implementation, the magnetic loops are located proximate the ends of the pendulum stroke and will thus experience the highest velocity levels developed by the pendulum. Accordingly, substantially high voltages can be achieved with only limited motion, i.e. a motion sufficient to unbalance the pendulum from any one of its bistable states. It is to be understood that the same phenomena that are involved in producing voltage and current on the windings also provide an opposite electromagnetic force opposing the pendulum motion. Thus much of the pendulum energy is dissipated in the course of producing electricity to reduce the impact of the pendulum at the end stops, shown herein as stops 65a and 65b.

Figure 3:
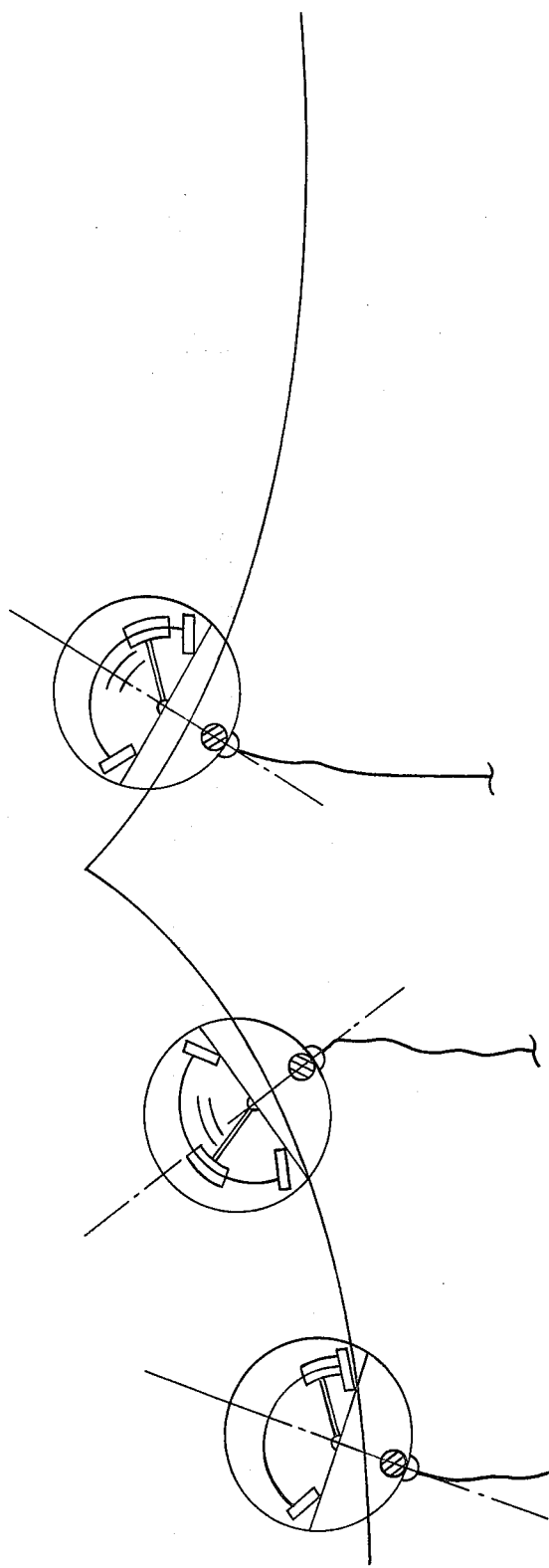
FIG. 3 is a sequential illustration of a buoy providing with a charging arrangement disclosed herein illustrating the motion thereof across wave fronts.
Figure 4:
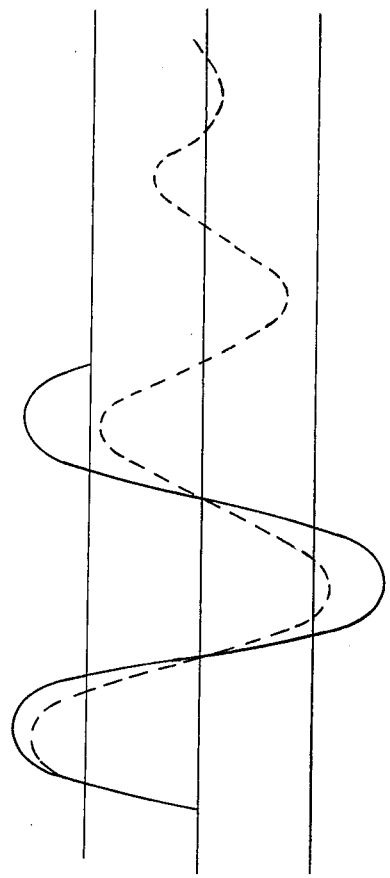
FIG. 4 is a oscillatory wave form enhanced by the astable arrangement of the pendulum utilized herein.

It is also to be understood, according to the illustration in FIG. 3, that the two bistable states of the pendulum concurrently develop trim attitudes for the buoy. Thus, the buoy will have a preferential trim in the plane of the pendulum track 55 with the result that the preferential alignment of the buoy will be orthogonal to the passage of the waves. As shown in FIG. 3 the combination of the ballast 21 and the instantaneous position of the pendulum bob weight will align the buoy assembly 10 in a bobweight forward alignment in the illustration in FIG. 1. As the wave W passes the bobweight rest position may pass the neutral or the gravitational axis resulting in the translation of the bobweight to the rear according to the illustration in FIG. 2. Further passage of the wave and particularly the crest thereof across the buoy 10 again aligns the buoy on the trailing wave surface which again may result in a neutral axis alignment which is beyond the stop limit of the bobweight. Thus the bobweight again will translate from its previous state. This is illustrated in the illustration III. In each instance the translation of the bob weight between its two stable states will add or destablilize the buoy. Thus, if the buoy has a particular base oscillatory motion inherent by virtue of its geometry and ballast this that motion will be destablilized by each bob weight swing. Accordingly, as shown in FIG. 4, the previously existing damped oscillatory motion shown by the curve D is expanded to larger oscillations each time the plus and minus stable limits SL+ and SL− respectively are crossed. The result obtained is enhancement of the oscillatory motion by the bob weight swing and therefore a substantially enhanced term of oscillations with each perturbing input.

By virtue of this arrangement of parts the number of excitation cycles with each buoy swing is effectively doubled, and furthermore, the response characteristics of the buoy assembly are increased to amplify the perturbations. Both of these phenomena add to the effective energy realized out of a particular sea state, thus increasing the effective generation characteristics without any substantial increase in material cost.

Obviously, many modifications and changes may be made to the foregoing description without departing from the spirit of the invention. It is therefore intended that the scope of the invention be determined solely on the claims appended hereto.

What is claimed is:

1. A wave motion powered electrical generator comprising:
    a substantially spherical hollow buoyant structure having a sealed exterior shell;
    a ballast weight mounted at a selected point on the interior of said buoyant structure for providing a preferred flotation alignment therefore when deployed on a body of liquid;
    a support platfrom disposed on the interior of said buoyant structure on said ballast weight and aligned along a horizontal plane an arcuate pivotal guide mounted on said support platform in a vertical plane relative thereto;
    a pivoted arm aligned for pivotal articulation in a vertical plane above said platform a weighted head conformed for receipt in said arcuate guide on the free end of said pivotal arm, said head having a substantially arcuate plan form extending as arc segments relative said pivoted arm each said arc segment being respectively provided with a first and second winding connected in a series circuit;
    a first and second magnetic loop mounted on said arcuate guide proximate the ends thereof, each magnetic loop including an air gap aligned to receive a corresponding one of said arcuate segments of said head according to the pivotal articulation thereof wherein said first or second windings are respectively passed through the corresponding ones of said air gap according to the pivotal motion of said arm; and
    rectifying means connected to said first and second winding for rectifying the induced currents therein.

* * * * *